(12) United States Patent
Kato

(10) Patent No.: US 6,621,770 B2
(45) Date of Patent: *Sep. 16, 2003

(54) OPTICAL PICKUP HAVING A POSITION-ADJUSTABLE OBJECTIVE LENS

(75) Inventor: Takahiro Kato, Saitama-ken (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,980

(22) Filed: Jul. 30, 1998

(65) Prior Publication Data

US 2001/0043521 A1 Nov. 22, 2001

(30) Foreign Application Priority Data

Aug. 8, 1997 (JP) ................................. 9-227409

(51) Int. Cl.⁷ .................................................. G11B 7/00
(52) U.S. Cl. .................................................. 369/44.14
(58) Field of Search .......................... 369/44.12, 44.14, 369/44.15, 44.16, 112

(56) References Cited

U.S. PATENT DOCUMENTS

| | | | | |
|---|---|---|---|---|
| 4,818,066 A | * | 4/1989 | Nose ........................ | 369/44.14 |
| 5,161,067 A | * | 11/1992 | Tomiyama et al. ...... | 360/44.15 |
| 5,267,089 A | * | 11/1993 | Yamamoto et al. ...... | 369/44.16 |
| 5,313,334 A | * | 5/1994 | Tomiyama et al. ...... | 369/44.16 |
| 5,598,397 A | * | 1/1997 | Sim ........................ | 369/44.15 |
| 5,719,834 A | * | 2/1998 | Futagawa et al. ........ | 369/44.15 |
| 5,777,972 A | * | 7/1998 | Furusawa ................ | 369/44.14 |
| 5,781,352 A | * | 7/1998 | Ujiie et al. .............. | 369/44.14 |
| 5,940,357 A | * | 8/1999 | Yamamiya ................ | 369/44.14 |

FOREIGN PATENT DOCUMENTS

| | | | | |
|---|---|---|---|---|
| JP | 59-223942 | * | 12/1984 | ............. 369/44.15 |
| JP | 61-182642 | * | 8/1986 | ............. 369/44.15 |
| JP | 1-185847 | * | 7/1989 | ............. 369/44.15 |
| JP | 4-205924 | * | 7/1992 | ............. 369/44.15 |
| JP | 5-109100 | * | 4/1993 | ............. 369/44.14 |
| JP | 5-128560 | * | 5/1993 | ............. 369/44.15 |

* cited by examiner

Primary Examiner—Nabil Hindi
(74) Attorney, Agent, or Firm—Arent Fox Kintner Plotkin & Kahn PLLC (57) ABSTRACT

An optical pickup device comprises an optical pickup body, a lens holder for holding the objective lens, a movable support member connected to the lens holder through a plurality of elongated flexible members for movably supporting the lens holder, a support section provided on the optical pickup body, said support section being arranged substantially perpendicular to an optical disc on which information is to be recorded or from which information is to be read out. In particular, the movable support member is adjustably attached on the support section in such a manner that the position of the objective lens is adjustable.

11 Claims, 8 Drawing Sheets

PRIOR ART

US 6,621,770 B2

OPTICAL PICKUP HAVING A POSITION-ADJUSTABLE OBJECTIVE LENS

BACKGROUND OF THE INVENTION

The present invention relates to an optical pickup device for recording information on an optical disc or for reproducing information from an optical disc.

A conventional optical pickup device includes a frame structure mounting a light source, a photodetector, and some other optical elements forming an optical path. Installed on the frame structure is a base section mounting an objective lens and a lens driving system.

When recording information on an optical disc or reproducing information therefrom, a beam light emitted from the light source is directed along the optical path to pass through the objective lens so as to irradiate an information recording surface of an optical disc. Meanwhile, a control means is used to control the movement of the objective lens in both a focus direction and a tracking direction, and a light reflected from the optical disc is also directed to pass through the objective lens so as to be received and detected by the photodetector.

In order to record or reproduce information correctly, the optical pickup device should be adjusted such that an optical axis of the objective lens is arranged on the optical path in a correct manner. For this reason, such optical device is usually provided with a position adjusting means to adjust the optical axis of an objective lens with respect to an information recording surface of an optical disc.

Figure 9:
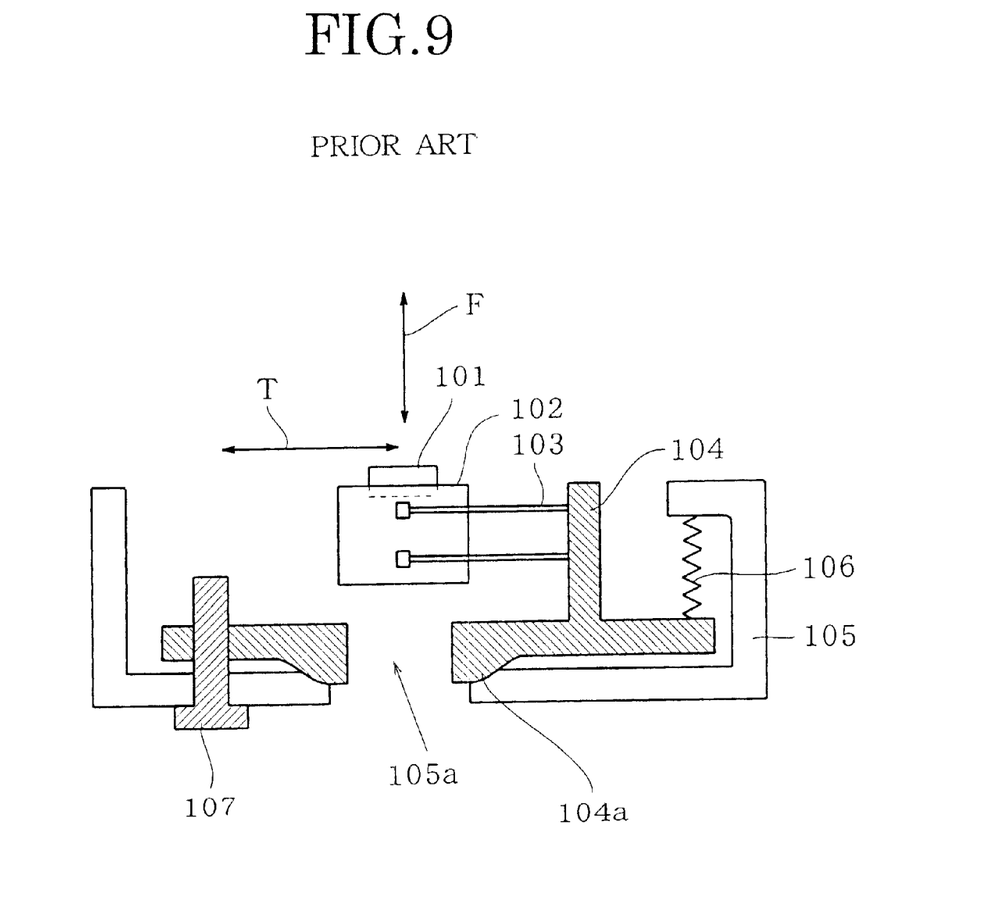
FIG. 9 is a sectional view in side elevation indicating the structure of an optical pickup device according to a prior art.

FIG. 9 is a sectional view in side elevation indicating the structure of a position adjusting means provided in a conventional optical pickup device. As shown in FIG. 9, a lens holder 102 on which an objective lens 101 is mounted and fixed, is movably supported by a support section 104 through a plurality of elongate flexible members 103, in a manner such that the objective lens 101 may be driven in both a focus direction (indicated by an arrow F in FIG. 9) and a tracking direction (perpendicular to the paper of FIG. 9). The support section 104 has an integrally formed protruding portion 104a having a partially spherical shape. In detail, the convex portion 104a is engaged in a notched recess 105a of a frame structure 105 carrying a light source (not shown), a photodetector (not shown), and some other optical elements (not shown) forming an optical path.

Referring again to FIG. 9, the support section 104 may be adjusted in its position with respect to the frame structure 105, by driving screws 107 in a clockwise or counterclockwise direction. Then, an adjusted position may be maintained by means of a spring 106 which causes the convex portion 104a to be urged against the notched recess 105a. In fact, there are two screws 107 formed in pair and disposed in two axial directions. By properly adjusting the pair of screws 107, the convex portion 104a may get tightly engaged in the notched recess 105 with the optical center of the objective lens 101 serving as a central axis. Therefore, it is possible to have the optical axis of the objective lens 101 adjusted in a radial direction (tracking direction) and in a tangential direction (indicated by an arrow T in FIG. 9).

However, with the conventional optical pickup device shown in FIG. 9, since the convex portion 104a is formed on the bottom of the base section 104 right under the objective lens 101, a sufficient space is needed in the thickness direction (optical axis direction) of the device. As a result, the optical pickup device has to obtain a considerable thickness, rendering it difficult to produce a compact device.

Moreover, since two screws 107 are needed to be disposed in two axial directions for adjusting the optical axis of the objective lens in both the radial direction and the tangential direction, it is difficult to reduce the number of necessary parts for forming the optical pickup device, thus production cost may not be easily lowered.

SUMMARY OF THE INVENTION

It is an object of the present invention to provide an improved optical pickup device having a small thickness and capable of adjusting the position of an objective lens using only a simplified structure, so as to solve the above-mentioned problems peculiar to the above-mentioned prior art.

According to the present invention, there is provided an improved optical pickup device holding an objective lens in a manner such that the objective lens is movable in both a focus direction and a tracking direction, said optical pickup device comprising: an optical pickup body; a lens holder for holding the objective lens; a movable support member connected to the lens holder through a plurality of elongated flexible members for movably supporting the lens holder; a support section provided on the optical pickup body, said support section being arranged substantially perpendicular to an optical disc on which information is to be recorded or from which information is to be read out. In particular, the movable support member is adjustably attached on the support section in such a manner that the position of the objective lens is adjustable.

In one aspect of the present invention, the elongated flexible members are linear wires, with one end of each connected to the lens holder and the other end of each to the movable support member, said linear wires being arranged in parallel to the optical disc on which information is to be recorded or from which information is to be read out.

In another aspect of the present invention, the support section is formed with a restricting groove having a predetermined width and extending in a direction substantially perpendicular to the optical disc, the movable support member is provided with a cylindrical sliding pin engageable and slidable in the restricting groove. Further, the support section has a sliding surface for the movable support member to slide thereon, the movable support member may be moved on the sliding surface so that its position is adjusted to thereby adjust the position of the objective lens. In particular, the sliding surface is a concave spherical surface which is formed by a part of a single spherical surface. Alternatively, the sliding surface is formed by combining several flat surfaces.

In further aspect of the present invention, the movable support member is formed with a plurality of spherical projections on one surface thereof which will come into contact with the sliding surface. Particularly, the spherical projections are arranged such that the normal line of each spherical projection at a contacting point with the sliding surface, may generally pass through the optical center of the objective lens.

In still further aspect of the present invention, the position adjustment of the objective lens includes adjusting the optical axis of the objective lens in both a radial direction and a tangential direction, with respect to the information recording surface of an optical disc on which information is to be recorded or from which information is to be read out. The adjustment in the radial direction is performed by rendering the pin to pivot in the restricting groove and rendering the movable support member to move over the sliding surface. The adjustment in the tangential direction is performed by rendering the pin to slide in the restricting groove and rendering the movable support member to move over the sliding surface.

The above objects and features of the present invention will become better understood from the following description with reference to the accompanying drawings.

BRIEF DESCRIPTION OF DRAWINGS

FIG. 5a is a side elevation indicating an eccentric driver for use in the lens position adjustment apparatus.

FIG. 5b is a rear view indicating the eccentric driver of FIG. 5a.

DETAILED DESCRIPTION OF THE PREFERRED EMBODIMENTS

Figure 1:
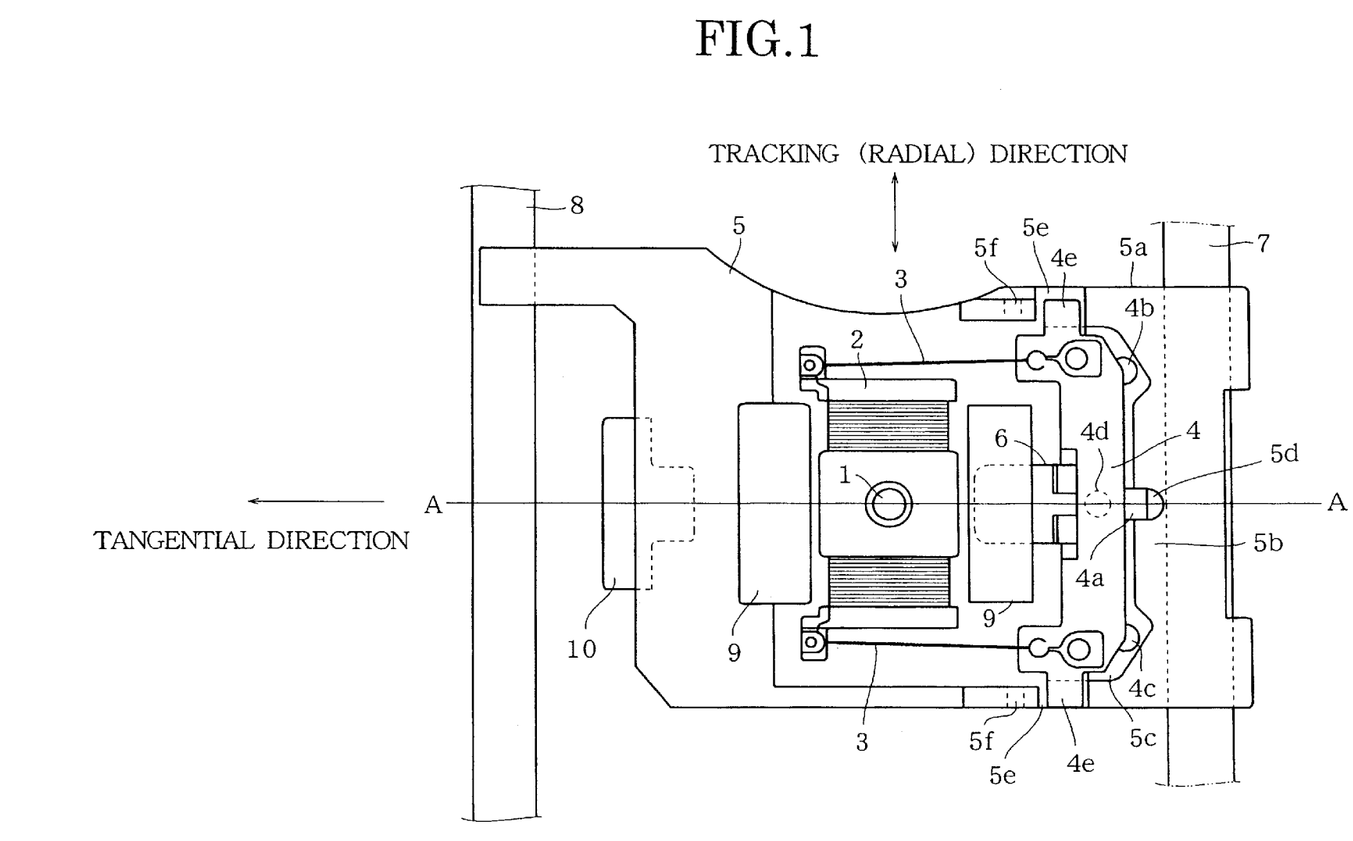
FIG. 1 is a top plane view indicating an optical pickup device made according to the present invention.
Figure 2:
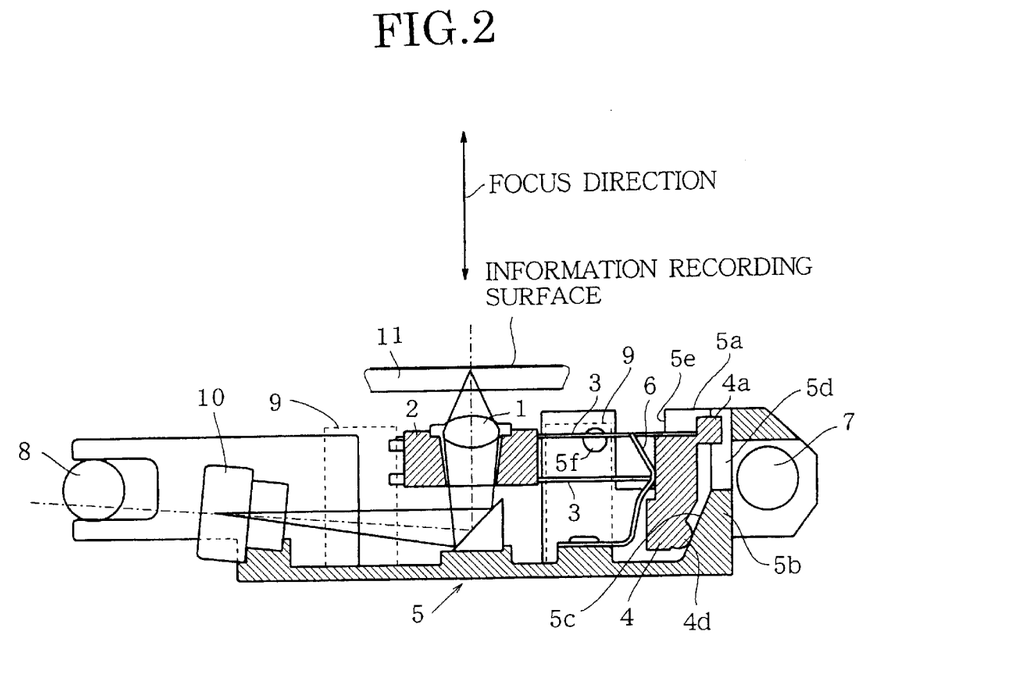
FIG. 2 is a sectional view in side elevation indicating the optical pickup device of FIG. 1.

Referring to FIGS. 1 and 2 showing an embodiment of the present invention, an objective lens 1 together with a focus coil and a tracking coil are fixed on a lens holder 2, in a manner such that the optical axis of the objective lens 1 is perpendicular to the paper of FIG. 1.

The lens holder 2 is connected with four flexible wires 3 at one end of each. The other end of each flexible wire 3 is connected to a movable support member 4. In fact, each of the four flexible wires 3 is made of a resin or a metal having a predetermined flexibility. The movable support member 4 serves to flexibly and floatingly support the lens holder 2 (carrying the objective lens 1) through the four flexible wires 3. In detail, the four flexible wires 3 are arranged in parallel in a manner such that the objective lens 1 is movable in both a focus direction (see FIG. 2) and a tracking direction (see FIG. 1).

A cylindrical pin 4a having its central axis coincident with a tangential direction passing through the optical center of the objective lens 1 and perpendicular to the tracking direction, is formed on the movable support member 4 at a position close to the center thereof. Further, spherical projections 4b, 4c, 4d are formed on the outer surface of the support member 4 along the outer circumference thereof.

Referring again to FIG. 1, a pair of grooves 4e, 4e are formed on two side surfaces of the movable support member 4, in a symmetrical relation with respect to the cylindrical pin 4a.

The above discussed elements are all mounted on a frame structure 5. A support portion 5a is formed upright on the frame structure 5, such that it is generally perpendicular to an optical disc 11 on which information recording or reproducing is to be performed.

Figure 3:
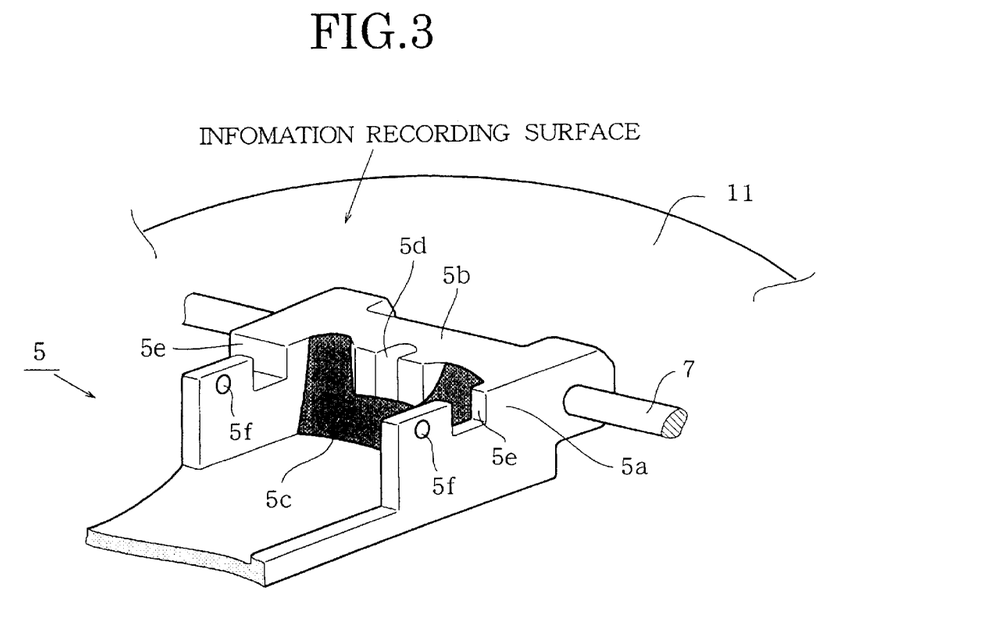
FIG. 3 is a perspective view indicating a part of the optical pickup device of FIG. 1.

FIG. 3 is a perspective view partially illustrating the frame structure 5 including the support portion 5a. In fact, the frame structure 5 is connected through both sides thereof to guide shafts 7 and 8 (see FIGS. 1 and 2) on an information recording/reproducing apparatus. As shown in FIG. 3, the support portion 5a is formed by an upright standing portion of the frame structure 5.

The support portion 5a includes a side wall portion 5b arranged lengthwise of the guide shaft 7. The inner surface of the side wall portion 5b is formed with a sliding surface 5c (indicated by black portion in FIG. 3). In more detail, the sliding surface 5c is formed by a recess portion which is part of a single spherical surface with the optical center of the objective lens 1 as its center. However, the curvature radius of the sliding surface 5c is greatly larger than that of each spherical projection 4b, 4c or 4d.

Referring again to FIG. 3, a groove 5d is formed on the middle of side wall portion 5b, in a manner such that the groove 5d is arranged in a direction perpendicular to an optical disc 11 mounted in position on the recording/reproducing apparatus. In particular, the groove 5 has a width so formed that when the pin 4a is inserted in the groove 5, the pin 4a is allowed to easily pivot or slide therealong.

Referring further to FIG. 3, a pair of notches 5e, 5e and a pair of through holes 5f are formed on opposite side walls arranged in a direction perpendicular to the lengthwise direction of the guide shaft 7.

Referring again to FIGS. 1 and 2, what are mounted on the frame structure 5 also includes a magnetic circuit (including a magnet, a yoke, and some other elements) for driving a coil, a leaf spring 6 for pressing the movable support member 4, a hologram unit 10 (including a light source, a photodetector and a spectroscope), and other optical elements (not shown) for forming an optical path.

The frame structure 5 is supported horizontally on both sides thereof by guide shafts 7 and 8, in a manner such that it is movable in the lengthwise direction of the guide shafts 7 and 8.

With the pin 4a inserted in the groove 5d, and with the movable support member 4 being pressed by the leaf spring 6 so that the spherical projections 4b, 4c, 4d are caused to get in contact with the sliding surface 5c, the movable support member 4 may be held in position on the side wall portion 5b of the frame structure 5.

The recess portion of the sliding surface 5c is so formed that the optical center of the objective lens 1 will always be kept at an unchanged position, irrespective of which positions the spherical projections 4b, 4c, 4d are in contact with the recess portion of the sliding surface 5c. In this way, when the movable support member 4 is installed on the side wall portion 5b of the frame structure 5, the center point of a spherical space defined by the sliding surface 5c will become substantially coincident with the optical center of the objective lens 1. Further, the spherical projections 4b, 4c, 4d are arranged such that the normal line of each spherical projection at a contact point (in contact with the sliding surface 5c), may generally pass through the optical center of the objective lens 1.

The movable support member 4 installed in the frame structure 5 may be easily adjusted in its position on the side wall portion 5b, a leaf spring 6 serves to maintain the movable member 4 at an adjusted position. By adjusting the position of the movable support member 4 in this manner, the position of the optical axis of the objective lens 1 in the tracking direction and tangential direction may be corrected properly, enabling the optical axis of the objective lens 1 to be adjusted so as to be completely coincident with a predetermined optical path.

The optical pickup device, after having been adjusted in the above manner, shall be connected on both sides thereof to the guide shafts 7 and 8. Then, as shown in FIG. 2, a beam light is emitted from a light source of the hologram unit 10, passing through the objective lens 1 along a predetermined optical path, so as to irradiate the information recording surface of an optical disc 11. A light reflected from the optical disc 11 is also directed to pass through the objective lens 1 so as to be detected by a photodetector. In this way, information recording or information reproducing may be performed on the optical disc 11.

The position adjustment of the optical pickup device will be described in more detail below.

In fact, the position adjustment of the optical pickup device is effected by adjusting the position of the movable support member 4 installed on the side wall portion 5b of the frame structure 5. In more detail, the movable support member 4 flexibly supporting the lens holder 2 (carrying an objective lens 1) by means of four flexible wires 3, is slightly pivoted in the tracking direction (radial direction), so as to correct or adjust the position of the optical axis of the objective lens in the radial direction, thus completing a radial skew adjustment. Further, the position of the movable support member 4 may be changed along the tangential direction, so as to correct or adjust the position of the optical axis of the objective lens 1 in the tangential direction, thus completing a tangential skew adjustment. Since the radial skew adjustment and the tangential skew adjustment may be performed independently, the position of the optical axis of the objective lens 1 in both the radial direction and the tangential direction may be easily adjusted, thereby ensuring that the optical axis of the objective lens 1 is coincident with a predetermined optical path in the optical pickup device.

Figure 4:
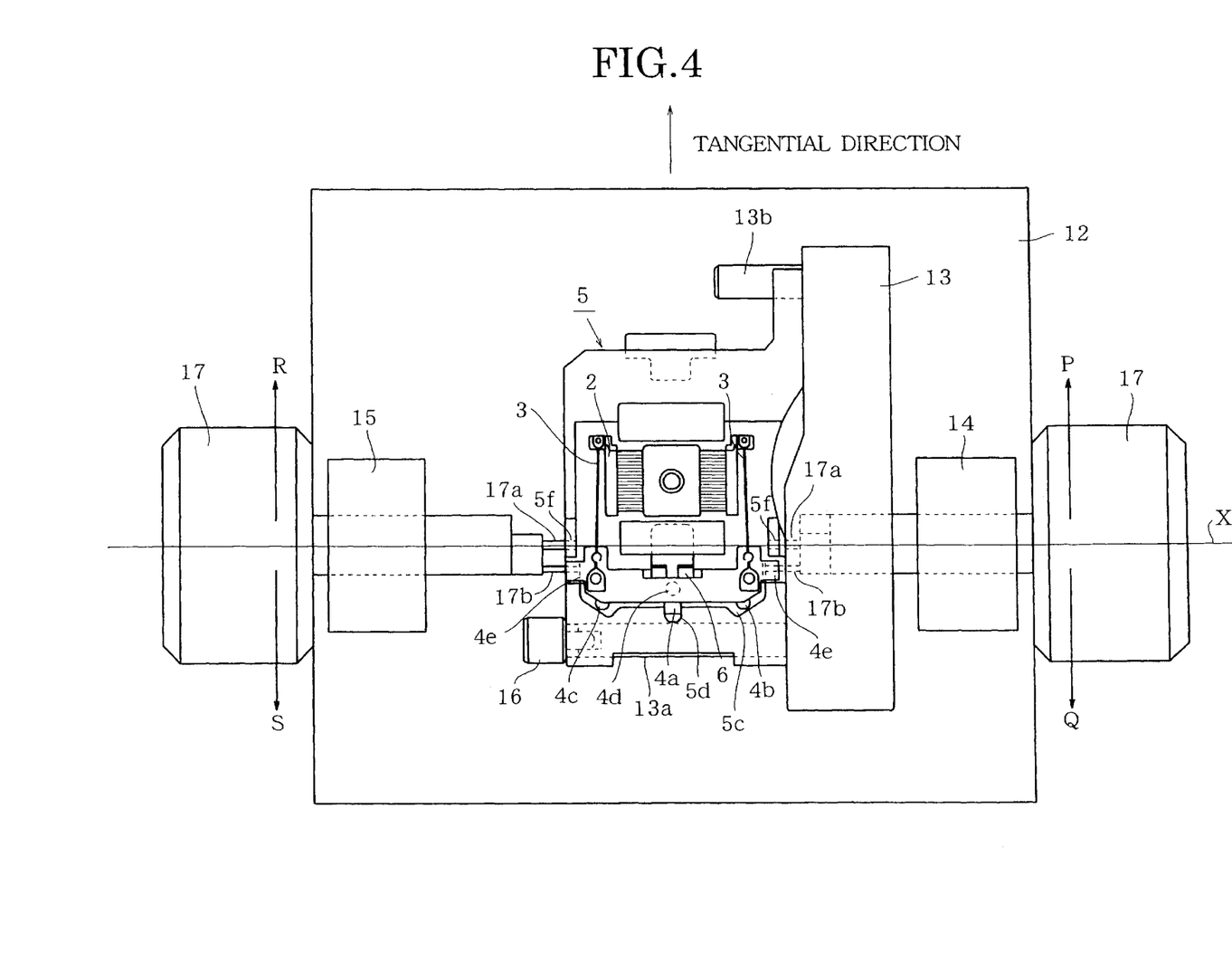
FIG. 4 is a top plane view indicating a condition where the optical pickup device has been attached on an lens position adjustment apparatus.

In practice, the position adjustment of the optical pickup device may be accomplished with the use of a skew adjustment apparatus shown in FIG. 4.

FIG. 4 is a top plane view illustrating a skew adjustment apparatus on which an optical pickup device has been attached. Referring to FIG. 4, the skew adjustment apparatus comprises a base section 12, a mounting structure 13 provided on the base section 12, a pair of bearings 14, 15 provided on either side of the mounting structure 13. The mounting structure 13 is adapted to mount the optical pickup device in a horizontal position. Further, a pair of guide shafts 13a, 13b are provided to more exactly keep the optical pickup device in the horizontal position. Then, a screw 16 is used to fix the optical pickup device in the above horizontal position to prevent any undesirable movement.

On either side of the optical pickup are a pair of adjusting grooves 4e and a pair of guide holes of formed on the frame structure 5. The pair of bearings 14, 15 are engaged with the adjusting grooves 4e and guide holes 5f, so as to rotatably support a pair of eccentric drivers 17, 17.

Figure 5:
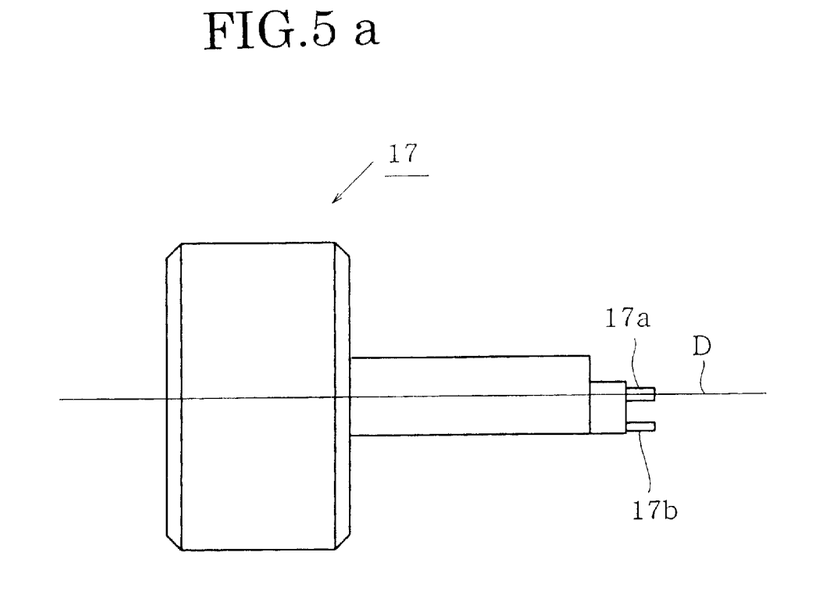

FIG. 5a is a side elevation showing each eccentric driver 17, FIG. 5b is a front view of the eccentric driver 17. As shown in FIG. 5a, a pair of cylindrical pins 17a and 17b are provided in parallel on each eccentric driver 17, with the pin 17a being coincident with the center axis D of the driver 17.

In this manner, the pin 17a is allowed to rotatably engage in the guide hole 5f formed on the side wall 5a of the frame structure 5, the pin 17b is allowed to slidably engaged in the adjusting groove 4e formed on the movable support member 4.

The skew adjustment of an optical pickup device in tangential direction with the use of the above skew adjusting apparatus will be described in detail below.

Referring to FIG. 4, the tangential skew adjustment may be accomplished by rotating the pair of eccentric drivers 17, 17 in the same direction through the same amount of angle so as to have the movable support member 4 inclined properly in the tangential direction.

In more detail, the eccentric driver 17 on the right is rotated through a certain angle in a direction P, while the eccentric driver 17 on the left is rotated simultaneously through the same angle in a direction R. Thus, both the left and right eccentric drivers 17, 17 are simultaneously rotated about the guide holes 5f through the same angle, so that each pin 17b in engagement with an adjusting groove 4e is moved upwardly as viewed in the FIG. 4.

Each notched recess 5e is so formed that the upward movement of each pin 17b during the tangential skew adjustment will not be hampered. As a result, each pin 17b is allowed to slid in a groove 4e so as to upwardly move the movable support member 4.

At this time, with the pin 4a engaged in the restricting groove 5d, the leaf spring 6 acts to push the movable support member 4 so that the spherical projections 4b, 4c, 4d get in contact with the sliding surface 5c. When the movable support member 4 is moved upwardly due to an action of each pin 17b, the pin 4a is caused to slid vertically along the restricting groove 5, so that the spherical projections 4b, 4c, 4d will slid along the sliding surface 5c.

At this moment, since the spherical projections 4b, 4c, 4d are arranged such that the normal line of each spherical projection at a contact point with the sliding surface 5c, may generally pass through the optical center of the objective lens 1, the movement of the movable support member 4 over the sliding surface 5c will not cause any change in the position of the optical center of the objective lens 1.

Since one pin 17a is moved an amount which is the same as that of the other pin 17a, the movable support member 4 may be horizontally raised up. Thus, the movable support member 4 is allowed to incline in one direction of the tangential direction without causing any change in the position of the optical axis of the objective lens 1. As a result, the optical axis of the objective lens 1 may be adjusted in its position in the tangential direction in a desired manner.

On the other hand, as shown in FIG. 4, the eccentric driver 17 on the right may be rotated through a certain angle in a direction Q, while the eccentric driver 17 on the left may be rotated simultaneously through the same angle in a direction S. Thus, both the left and right eccentric drivers 17 may be simultaneously rotated about the guide holes of through the same angle, so that each pin 17b in engagement with an adjusting groove 4e is moved downwardly as viewed in the FIG. 4.

Thus, through operations similar to those discussed above, the optical axis of the objective lens 1 may be inclined in an opposite direction (opposite to the above-mentioned direction) of the tangential direction in a desired manner.

As discussed above, the tangential skew adjustment may be accomplished by rotating the pair of eccentric drivers 17, 17 in the same direction through the same amount of angle so as to have the movable support member 4 adjusted properly in its position in the tangential direction. In practice, such tangential skew adjustment shall be performed until an inclination angle of the optical axis of the objective lens 1 in the tangential direction becomes zero.

Figure 6:
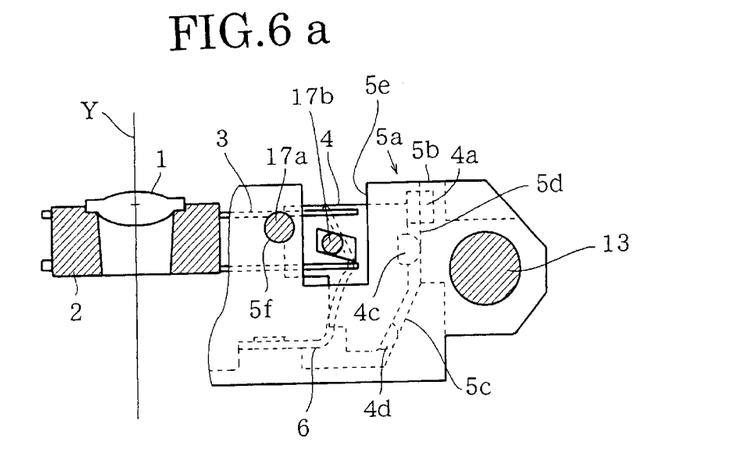
FIGS. 6a–6c are explanatory views indicating that the position of the movable support member of the optical pickup device may be changed in a radial direction by means of eccentric drivers.

FIGS. 6a–6c are cross sectional views indicating that an optical pickup device may be in various different positions when attached on a skew adjustment apparatus, and that the movable support member 4 of the optical pickup device may be pivoted by a pair of eccentric drivers 17, 17 to different positions in the tangential direction with respect to the frame structure 5.

FIG. 6a indicates a condition where the optical axis L of the objective lens 1 is coincident with a predetermined optical axis Y of the optical pickup device, whilst FIGS. 6b and 6c indicate conditions where the optical axis L of the objective lens 1 is deviated from a predetermined optical axis Y of the optical pickup device.

Thus, when the movable support member 4 is located on the side wall portion 5b as shown in FIG. 6b, the optical axis L of the objective lens 1 may be made coincident with the optical axis Y of the optical pickup device by rotating the right eccentric driver 17 in a direction P and simultaneously rotating the left eccentric driver 17 in a direction R.

On the other hand, when the movable support member 4 is located on the side wall portion 5b as shown in FIG. 6c, the optical axis L of the objective lens 1 may be made coincident with the optical axis Y of the optical pickup device by rotating the right eccentric driver 17 in a direction Q and simultaneously rotating the left eccentric driver 17 in a direction S.

Figure 7:
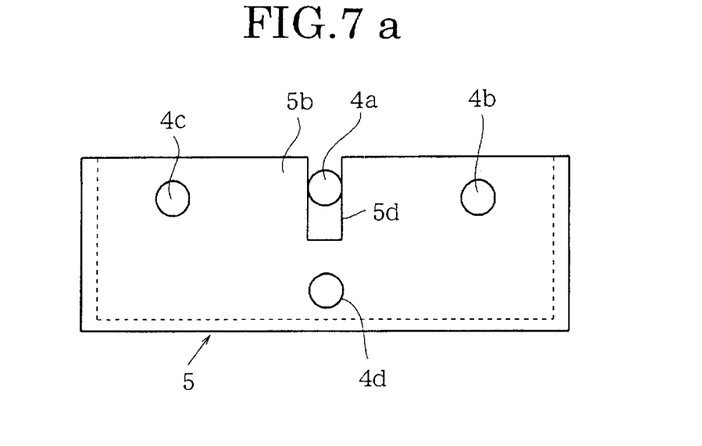
FIGS. 7a–7c are explanatory views indicating that the position of the movable support member of the optical pickup device may be changed in a tangential direction by means of eccentric drivers.

FIGS. 7a–7c are explanatory views taken perpendicularly to FIGS. 6a–6c, indicating various positions of the spherical projections 4b, 4c, 4d of the movable support member 4 with respect to the frame structure 5.

Namely, when the movable support member 4 is located on the side wall portion 5b as shown in FIG. 6b, the spherical projections 4b, 4c, 4d will be disposed in a manner as shown in FIG. 7b. Thus, by rotating the right eccentric driver 17 in a direction P and simultaneously rotating the left eccentric driver 17 in a direction R, the pin 4a will move vertically to an upper position along the groove 5d, enabling all the spherical projections 4b, 4c, 4d to move vertically to upper positions. In this way, a relative relationship between the spherical projections 4b, 4c, 4d and the frame structure 5 will be like that shown in FIG. 7a, rendering an inclination of the optical axis L of the objective lens 1 in the tangential direction to become zero.

On the other hand, when the movable support member 4 is located on the side wall portion 5b as shown in FIG. 6c, the spherical projections 4b, 4c, 4d will be disposed in a manner as shown in FIG. 7c. Thus, by rotating the right eccentric driver 17 in a direction Q and simultaneously rotating the left eccentric driver 17 in a direction S, the pin 4a will move vertically to a lower position along the groove 5d, enabling all the spherical projections 4b, 4c, 4d to move vertically to lower positions. In this way, a relative relationship between the spherical projections 4b, 4c, 4d and the frame structure 5 will be like that shown in FIG. 7a, rendering an inclination of the optical axis L of the objective lens 1 in the tangential direction to become zero.

Now, the radial skew adjustment will be described in detail below with reference to FIG. 4. As shown in FIG. 4, when the right eccentric driver 17 is rotated in a direction P and simultaneously the left eccentric driver 17 is rotated in a direction S, the pair of eccentric drivers 17, 17 are rotated about the guide holes 5f in opposite directions but through the same angle. In this way, the pin 17b of the right eccentric driver 17 will move upwardly (as viewed in FIG. 4) along an arc-like path, while the pin 17b of the left eccentric driver 17 will move downwardly (as viewed in FIG. 4) along an arc-like path.

As a result, the pin 17b of the right eccentric driver 17 will slid along the groove 4e to cause the movable support member 4 to move upwardly. On the other hand, the pin 17b of the left eccentric driver 17 will slid along the groove 4e to cause the movable support member 4 to move downwardly.

At this time, with the pin 4a engaged in the restricting groove 5d, the movable support member 4 is pressed by the leaf spring 6 so that the spherical projections 4b, 4c, 4d get in contact with the sliding surface 5c. Thus, when the pins 17b of the two eccentric drivers 17 move, the pin 4a engaged in the restricting groove 5d will be pivoted in the groove 5d, so that the spherical projections 4b, 4c, 4d are able to slid over the sliding surface 5c.

At this moment, since the spherical projections 4b, 4c, 4d are arranged such that the normal line of each spherical projection at a contact point with the sliding surface 5c, may generally pass through the optical center of the objective lens 1, the movement of the movable support member 4 over the sliding surface 5c will not cause any change in the position of the optical center of the objective lens 1.

Thus, the movable support member 4 may be adjusted in the radial direction without causing any change in the position of the optical axis of the objective lens 1. As a result, the optical axis of the objective lens 1 is adjusted in its position in the radial direction in a desired manner.

On the other hand, as shown in FIG. 4, when the right eccentric driver 17 is rotated in a direction Q and simultaneously the left eccentric driver 17 is rotated in a direction R, the pair of eccentric drivers 17, 17 are rotated about the guide holes 5f in opposite directions but through the same angle. In this way, the pin 17b of the right eccentric driver 17 will move upwardly (as viewed in FIG. 4) along an arc-like path, whilst the pin 17b of the left eccentric driver 17 will move downwardly (as viewed in FIG. 4) along an arc-like path.

Thus, the movable support member 4 is allowed to be adjusted in the radial direction, so that the optical axis of the objective lens 1 may be adjusted in its position in the radial direction.

Similar to the above tangential skew adjustment, the radial skew adjustment shall also be performed until an inclination angle of the optical axis of the objective lens 1 in the radial direction becomes zero.

Figure 8:
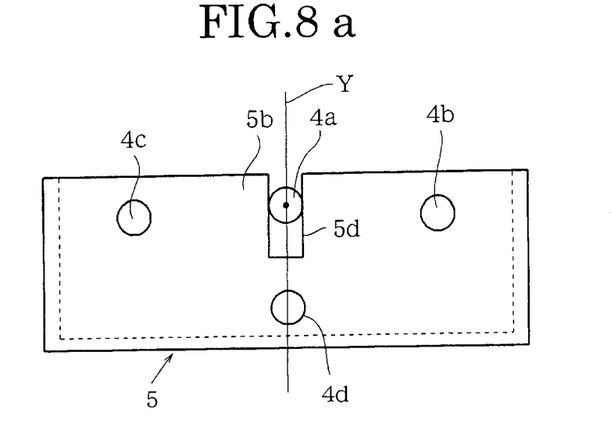
FIGS. 8a–8c are explanatory views indicating that the spherical projections of the movable support member of the optical pickup device may be changed in their positions in a tangential direction by means of eccentric drivers.

FIGS. 8a–8c are explanatory views, indicating that the positions of the spherical projections 4b, 4c, 4d of the movable support member 4 (of the optical pickup device when mounted on the skew adjustment apparatus shown in FIG. 4) may be changed in the radial direction with respect to the frame structure 5.

FIG. 8a indicates a condition where the optical axis L of the objective lens 1 is coincident with a predetermined optical axis Y of the optical pickup device, whilst FIGS. 8b and 8c indicate conditions where the optical axis L of the objective lens 1 is deviated from a predetermined optical axis Y of the optical pickup device.

Thus, when the movable support member 4 is located on the side wall portion 5b as shown in FIG. 8b, the optical axis L of the objective lens 1 may be made coincident with the optical axis Y of the optical pickup device by rotating the right eccentric driver 17 in a direction P and simultaneously rotating the left eccentric driver 17 in a direction S. At this time, the pin 4a engaged in the restricting groove 5d will be pivoted without having any movement in the vertical direction.

On the other hand, when the movable support member 4 is located on the side wall portion 5b as shown in FIG. 8c, the optical axis L of the objective lens 1 may be made coincident with the optical axis Y of the optical pickup device by rotating the right eccentric driver 17 in a direction Q and simultaneously rotating the left eccentric driver 17 in a direction R. Similarly, the pin 4a engaged in the restricting groove 5d will be pivoted without having any movement in the vertical direction.

As is understood from the above description, the position adjustment of an optical pickup device may be accomplished by respectively performing the tangential skew adjustment and the radial skew adjustment. Therefore, when an optical pickup device is in a process of being installed in an information recording/reproducing apparatus, the objective lens 1 may be easily and properly adjusted in its position so that the optical axis L of the objective lens 1 may be easily made coincident with the optical axis Y of the optical pickup device.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An optical pickup device holding an objective lens in a manner such that the objective lens is movable in both a focus direction and a tracking direction, said optical pickup device comprising:

an optical pickup body;

a lens holder configured to hold the objective lens;

a movable support member connected to the lens holder through a plurality of elongated flexible members for movably supporting the lens holder;

a support section provided on the optical pickup body and adjustably attached to the movable support member, said support section being arranged substantially perpendicular to an optical disc from which recorded information is to be read out;

wherein the movable support member is adjustably attached on the support section in such a manner that n optical axis of the objective lens is adjustable in a tangential direction and a radial direction, and wherein the support section is formed with a restricting groove having a predetermined width and extending in a direction substantially perpendicular to the optical disc, the movable support member is provided with a cylindrical sliding pin engageable and slidable in the restricting groove.

2. The optical pickup device according to claim 1, wherein the elongated flexible members are linear wires, with one end of each connected to the lens holder and the other end of each to the movable support member, said linear wires being arranged in parallel to the optical disc on which information is to be recorded or from which information is to be read out.

3. The optical pickup device according to claim 2, wherein the support section has a sliding surface for the movable support member to slide thereon, the movable support member may be moved on the sliding surface so that its position is adjusted to thereby adjust the position of the objective lens.

4. The optical pickup device according to claim 3, wherein the sliding surface is a concave spherical surface which is formed by a part of a single spherical surface.

5. The optical pickup device according to claim 3, wherein the sliding surface is a concave surface which is formed by a part of a spherical surface or formed by combining several flat surfaces.

6. The optical pickup device according to claim 3, 4 or 5, wherein the movable support member is formed with a plurality of spherical projections on one surface thereof which will come into contact with the sliding surface.

7. The optical pickup device according to claim 6, wherein the spherical projections are arranged such that the normal line of each spherical projection at a contacting point with the sliding surface, may generally pass through the optical center of the objective lens.

8. The optical pickup device according to claim 6, wherein the movable support member is provided with a plurality of spherical projections on one surface thereof which will come into contact with the concave spherical surface of the sliding surface.

9. The optical pickup device according to claim 1, wherein an adjustment in the radial direction is performed by rendering the pin to pivot in the restricting groove and rendering the movable support member to move over the sliding surface.

10. The optical pickup device according to claim 1, wherein an adjustment in the tangential direction is performed by rendering the pin to slide in the restricting groove and rendering the movable support member to move over the sliding surface.

11. An optical pickup device holding an objective lens in a manner such that the objective lens is moving in both a focus direction and a tracking direction, said optical pickup device comprising:

an optical pickup body;

a lens holder configured to hold the objective lens;

a movable support member connected to the leans holder through a plurality of elongated flexible members for supporting the lens holder movably;

a support section provided on the optical body and adjustably attached to the movable support member, aid support section being arranged substantially perpendicular to an optical disc, from which recorded information is to be read out;

wherein the movable support member is adjustably attached to the support section so that the movable suport member can be manually adjusted, with regard to the support section, in both tangential and radial directions of the optical disc, and wherein the support section is formed with a restricting groove having a predetermined width and extending in a direction substantially perpendicular to the optical disc, the movable support member is provided with a cylindrical sliding pin engageable and slidable in the restricting groove.

* * * * *